(12) United States Patent
Manchester et al.

(10) Patent No.: US 8,270,934 B2
(45) Date of Patent: Sep. 18, 2012

(54) CONFIGURING NETWORK SETTINGS FOR A POWER LINE NETWORKING DEVICE

(75) Inventors: Scott Manchester, Redmond, WA (US);
James A. Mentz, Gainesville, FL (US);
Younus Aftab, Redmond, WA (US);
Andreas H. Melder, Frisco, TX (US);
Greg J. Gangitano, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 625 days.

(21) Appl. No.: 11/584,929

(22) Filed: Oct. 23, 2006

(65) Prior Publication Data

US 2007/0271398 A1    Nov. 22, 2007

Related U.S. Application Data

(60) Provisional application No. 60/802,424, filed on May 22, 2006.

(51) Int. Cl.
*H04M 9/00* (2006.01)
*H04M 3/00* (2006.01)
*H04W 4/00* (2009.01)

(52) U.S. Cl. ............ 455/402; 455/418; 455/432.2

(58) Field of Classification Search ............ 455/402, 455/418, 432.2
See application file for complete search history.

(56) References Cited

U.S. PATENT DOCUMENTS

| | | | | |
|---|---|---|---|---|
| 5,838,226 A | * | 11/1998 | Houggy et al. | 340/310.11 |
| 6,175,860 B1 | * | 1/2001 | Gaucher | 709/208 |
| 6,856,799 B1 | * | 2/2005 | Ritter | 455/402 |
| 6,987,985 B2 | * | 1/2006 | Purkayastha et al. | 455/552.1 |
| 7,457,885 B2 | * | 11/2008 | Chan et al. | 709/250 |
| 2003/0006881 A1 | * | 1/2003 | Reyes | 340/310.01 |
| 2004/0133689 A1 | * | 7/2004 | Vasisht | 709/228 |
| 2005/0030946 A1 | * | 2/2005 | Carty et al. | 370/389 |
| 2005/0254516 A1 | * | 11/2005 | Binder | 370/463 |
| 2006/0018328 A1 | * | 1/2006 | Mody et al. | 370/401 |
| 2006/0294366 A1 | * | 12/2006 | Nadalin et al. | 713/156 |

* cited by examiner

*Primary Examiner* — Jean Gelin
*Assistant Examiner* — Edd Rianne Plata
(74) *Attorney, Agent, or Firm* — Hope Baldauff Hartman, LLC

(57) ABSTRACT

A system, apparatus, method, and computer-readable media are provided for configuring a power line networking device. According to one method, wireless network settings are converted into equivalent power line network settings compatible with a power line network. The converted settings are then utilized to configure the power line networking device for operation on the power line network. The power line network may be compatible with the HOMEPLUG networking standard by the HOMEPLUG POWER ALLIANCE. The wireless network settings may include a SSID and a wireless network key. The conversion process may be performed by a power line networking device or by a computer in communication with the power line networking device. The conversion and configuration may be performed in response to detecting that the power line networking device has not been configured for operation with the power line network.

14 Claims, 9 Drawing Sheets

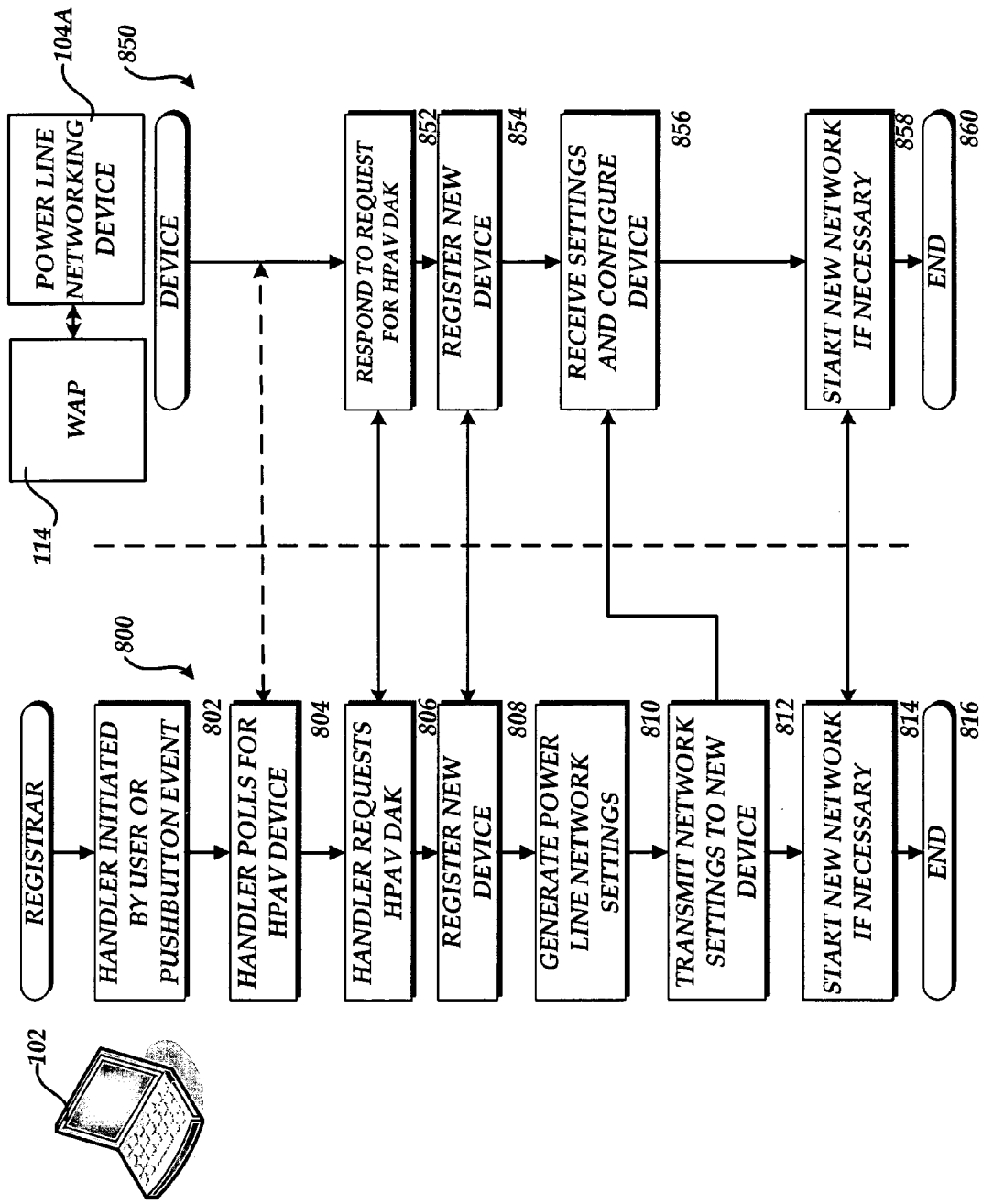

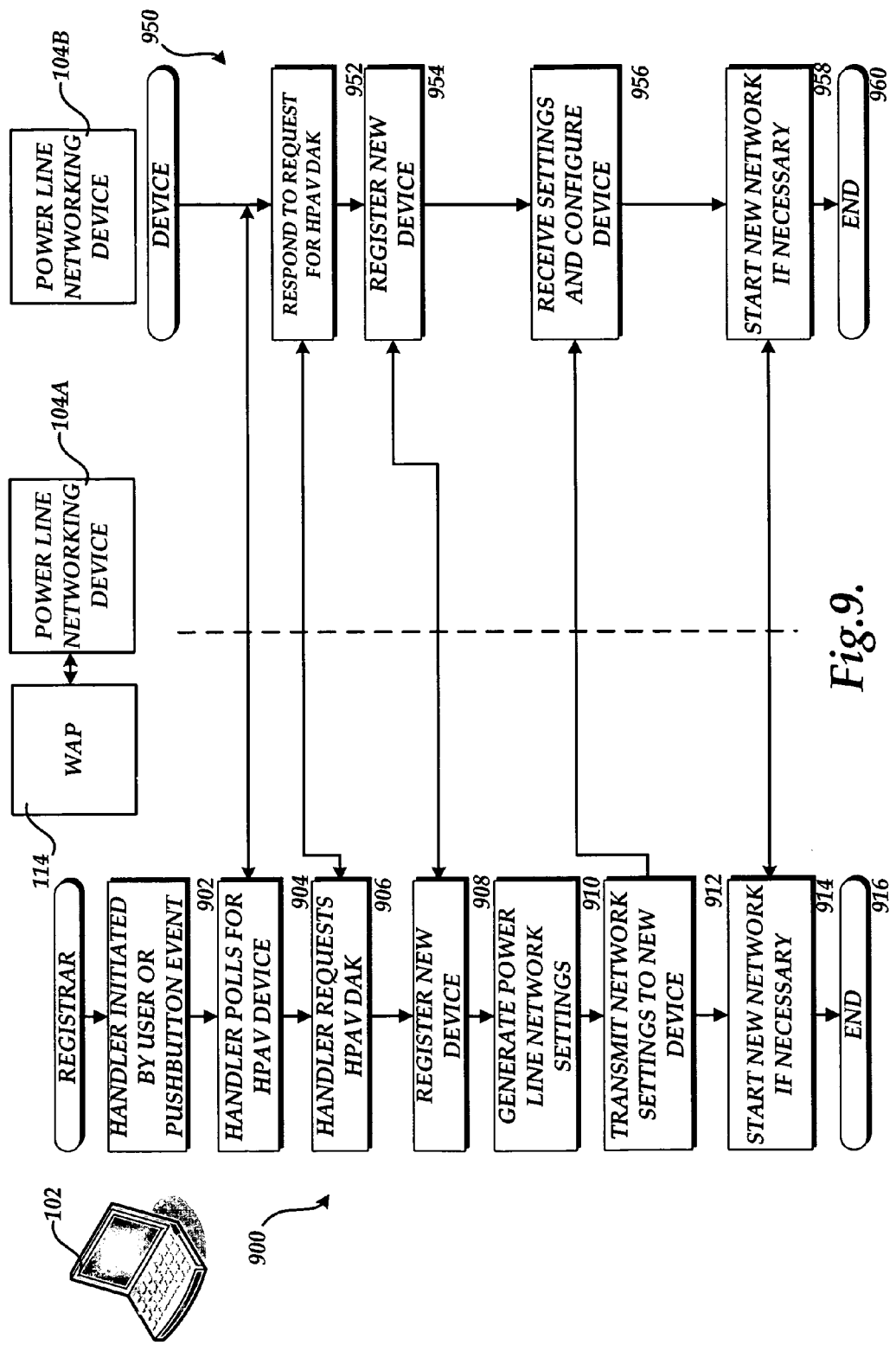

CONFIGURING NETWORK SETTINGS FOR A POWER LINE NETWORKING DEVICE

CROSS-REFERENCE TO RELATED APPLICATIONS

This application claims the benefit of provisional U.S. Patent Application No. 60/802,424, filed on May 22, 2006, and entitled "Configuring Network Settings for a Powerline Networking Device," which is expressly incorporated herein by reference in its entirety.

BACKGROUND

It is common today for homes to include several computer networks. For instance, the computers in many homes today are connected to a wide-area network ("WAN"), such as the Internet, through a residential gateway. The computers may connect to the residential gateway, and also to other computers in the home, through a wired or wireless network. Other computers or networking devices in the home may also be connected through a power line network. A power line network is a network that utilizes power transmission lines as the physical medium for transmitting data. Configuring each of these networks can be a challenging and time consuming process, especially for the uninitiated.

In order to configure some types of networks, a user must create a profile that includes the network settings used to establish a connection to the network. For instance, wireless networks often require the user to specify a service set identifier ("SSID") and a wireless network key. These settings, and potentially others, are then stored in a wireless network profile that is utilized by devices when connecting to the network. For users uninitiated with the process of creating a network profile, this process can be confusing and somewhat time consuming.

Other types of networks may also require a user to create a profile that includes network settings used to establish a connection to the network. For instance, like wireless networks, power line networks also require a user to create a profile with network settings. In order to create a profile for a power line network, a user is typically asked to provide at least a network name and a security key for the power line network.

The process for creating a power line network profile is generally similar to the process for creating a wireless network profile. However, power line network profiles and wireless network profiles are incompatible. Therefore, in the case where both a power line network and a wireless network are utilized, it is necessary to create two different and incompatible network profiles. This can make the process of configuring the networks unnecessarily time consuming.

It is with respect to these considerations and others that aspects of a system, method, apparatus, and computer-readable media are provided for configuring network settings for a power line networking device.

SUMMARY

A system, apparatus, method, and computer-readable media are provided for configuring a power line networking device. In particular, according to one method wireless network settings are converted into equivalent power line network settings compatible with a power line network. The converted settings are then utilized to configure the power line networking device for operation on the power line network. In this manner, only the wireless network settings must be specified. The wireless network settings are then are mapped to equivalent wireless network settings that are compatible with the power line network. This allows a user to create one profile containing network settings that can be applied to networking devices on wireless networks and on power line networks, thereby simplifying the process of configuring networking devices on the power line network.

According to other aspects of the method, the power line network may be compatible with the HOMEPLUG networking standard by the HOMEPLUG POWER ALLIANCE. HOMEPLUG is a specification for technology that connects devices to each other through the power lines in a home. HOMEPLUG-certified products connect personal computers and other devices that use Ethernet, universal serial bus ("USB"), and wireless technologies to the power line via a HOMEPLUG bridge or adapter. The HOMEPLUG networking standard includes devices compatible with both the HOMEPLUG 1.0 and HOMEPLUG AV standards.

According to other aspects of the method, the wireless network settings may include a SSID. During conversion, the SSID is converted to a power line equivalent network name. The wireless network settings may also include a wireless network key. For instance, the wireless network key may include a wired equivalent privacy ("WEP") key, a WI-FI protected access ("WPA") key, or a WPA version two key. During conversion, the wireless network key is converted into an equivalent power line network key. The power line equivalent network name and power line network key are then utilized to configure networking devices for operation on the power line network.

According to other aspects of the method, the wireless network settings may be transmitted to a power line networking device. The power line networking device may then perform the conversion process for converting the wireless network settings into power line network settings. Alternatively, the wireless network settings may be converted to power line network settings by a computer in communication with the power line networking device. Once the wireless network settings have been converted to power line network settings, the computer is operative to transmit the converted settings to the power line networking device. The computer may convert the wireless network settings to power line network settings and configure the power line networking device with the converted settings in response to detecting that the power line networking device has not been configured for operation with the power line network.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6-9 are flow diagrams illustrating various processes for the configuration of legacy power line networking devices according to several implementations presented herein.

DETAILED DESCRIPTION

Figure 1:
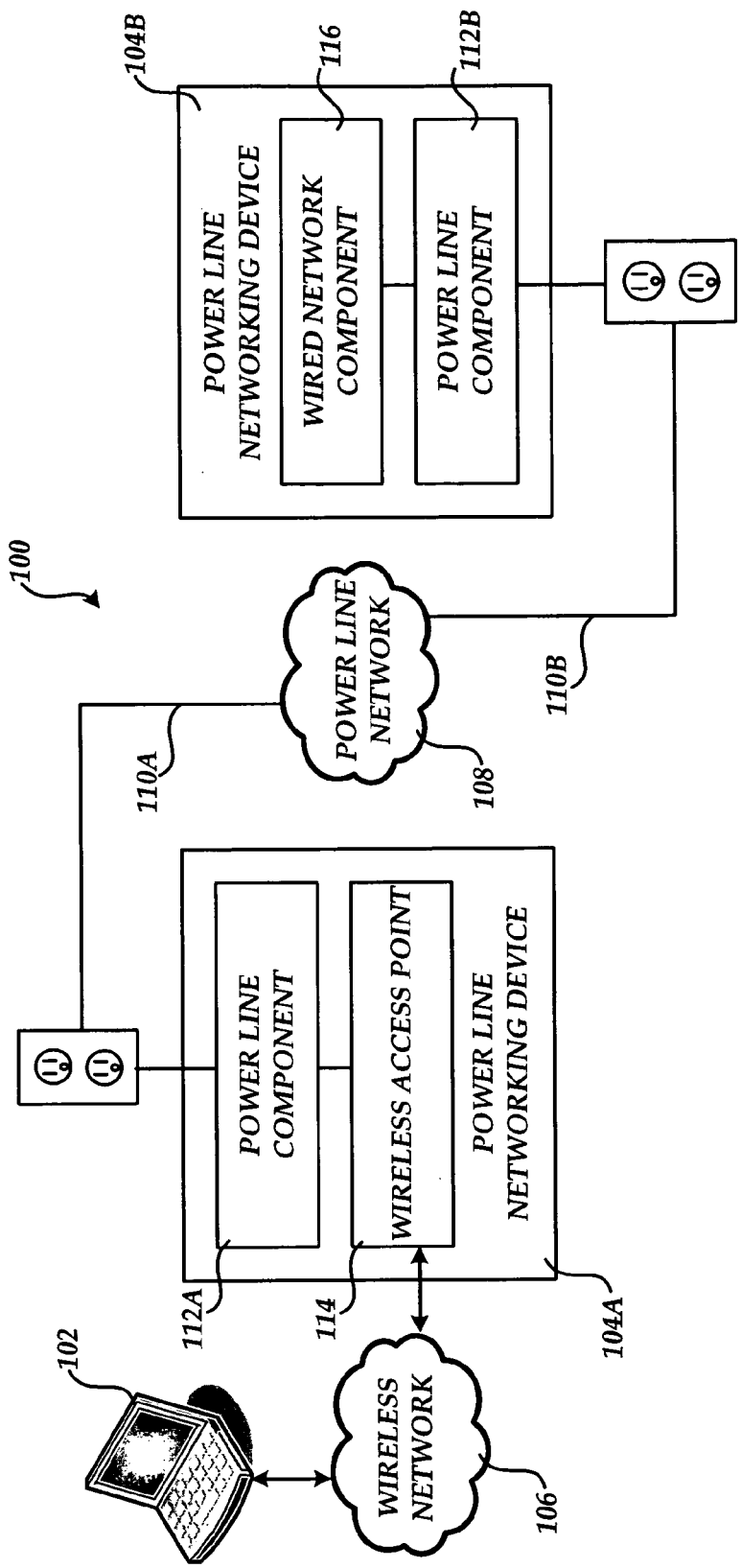
FIG. 1 is a network diagram showing aspects of an illustrative operating environment for embodiments presented herein.

The following detailed description is directed to systems, methods, and computer-readable media for configuring a power line networking device. While the subject matter described herein is presented in the general context of program modules that execute in conjunction with the execution of an application program or an operating system on a computer system, those skilled in the art will recognize that other implementations may be performed in combination with other program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

The various embodiments presented herein are described in the context of a power line networking device compatible with the HOMEPLUG networking standard from the HOMEPLUG POWER ALLIANCE. HOMEPLUG is a specification for technology that connects devices to each other through the power lines in a home. HOMEPLUG-certified products connect personal computers and other devices that utilize Ethernet, USB, and wireless technologies to the power line via a HOMEPLUG bridge or adapter. As utilized herein, the term "HOMEPLUG" includes both the HOMEPLUG 1.0 and HOMEPLUG AV specifications and devices compatible therewith. Devices compatible with the HOMEPLUG 1.0 standard are configured for speeds up to 14 Mbit/s while devices compatible with the HOMEPLUG AV standard are capable of speeds greater than 100 Mbit/s. HOMEPLUG AV devices are compatible with HOMEPLUG 1.0 devices. It should be appreciated that although the embodiments presented herein are described in the context of HOMEPLUG-compatible devices and networks, the embodiments described herein may be utilized with other types of power line networking devices compatible with other standards.

Prior to discussing the specifics of the implementations presented herein, a general description of the security provided by the HOMEPLUG AV specification will be provided. In particular, the HOMEPLUG AV specification defines two levels of security: low-level security and lock-down security. Low-level security is instantiated by the mating of two devices through a HOMEPLUG AV pushbutton that acts at the HOMEPLUG media access control ("MAC") layer. This low-cost method is expected to be adopted by consumer electronics that do not have an internet protocol ("IP") stack, interface or a display, such as self-powered speakers. Lock-down security is implemented by all HOMEPLUG AV devices that are capable of an out-of-band encryption key exchange. In this implementation, a strong encryption key is exchanged out-of-band, such as through user entry, Flash Configuration, or a WINDOWS CONNECT NOW ("WCN") personal identification number ("PIN") or pushbutton. The WCN version 2 ("WCNv2") protocol defines a key exchange mechanism between devices that have not yet been admitted to the network. Devices that incorporate HOMEPLUG AV transceivers can interact with the WINDOWS VISTA operating system from MICROSOFT CORPORATION of Redmond, Wash. to create secure local area networks ("LANs") and wireless LANs ("WLANs"). It should be appreciated that the embodiments described herein may be utilized with other operating systems from MICROSOFT CORPORATION and with operating systems from other manufacturers.

To maintain the integrity of high-level security, HOMEPLUG-compatible devices will not provide the lock-down security key to another device that has initiated HOMEPLUG AV pushbutton security. Regardless of which security level a device is shipped with, each HOMEPLUG AV device will have a Device Password ("DPW") printed on the bottom of the device that can be used to enter the device into a lock-down network. A device in low-level security mode can be brought into Lock-down security mode in three ways: First, another station on the power line may bring a HOMEPLUG device into the lock-down network by using the DPW of the new device; second, a personal computer ("PC") host on the trusted (in this example, non-power line) side of the HOMEPLUG AV transceiver may provide a lock-down key to the device; third, the embedded host processor (non-power line in this example) incorporated into the HOMEPLUG AV transceiver may give the transceiver a lock-down key obtained through Flash Configuration or WCN, including a WCN Pushbutton.

As discussed in greater detail herein, HOMEPLUG AV WCN is a protocol that allows LAN and WLAN devices to take the WEP key, the WPA key, or a WPA version two encryption key utilized to secure the WLAN and also configure the HOMEPLUG AV network. The protocol assumes that the interaction with the operating system of the PC is defined, and must operate without requiring new behavior by the operating system. However, the protocol also defines messages that a HOMEPLUG AV WCN device should forward to a host PC to allow an application or future operating system handler or service to further improve the HOMEPLUG AV network configuration experience.

HOMEPLUG AV networks have names called Human Friendly Identifiers ("HFID"). A HOMEPLUG AV networking device, or station, may see other stations with other HFIDs even though the stations may not be associated with each other or capable of forwarding IP traffic between devices. Unassociated stations are capable of communicating a limited amount of data to each other through a HOMEPLUG AV mechanism known as the Encrypted Payload MAC Management Entry ("MME"). HOMEPLUG AV WCN stations should encapsulate WCN discovery information in the Encrypted Payload MME and deliver this information to other stations. Upon receipt, a station should de-encapsulate the WCN discovery information and forward it to its host. This mechanism allows the WINDOWS VISTA operating system from MICROSOFT CORPORATION or another compatible operating system to discover new HOMEPLUG AV devices and to admit them to the network using the WCN protocol. This process is described in greater detail below.

It should be appreciated that in addition to the HOMEPLUG specification, other specifications may be relevant to the disclosure presented herein. In particular, the IEEE 2004 Bridge Specification describes an architecture for the interconnection of IEEE 802 LANs below the MAC service boundary. This specification is available from the Institute of Electrical and Electronics Engineers, Inc. Whitepapers, specification details, and other information describing the WCNv2 protocol are available from MICROSOFT CORPORATION of Redmond, Wash. The HOMEPLUG AV specification is available from the HOMEPLUG POWER ALLIANCE. Each of these sources is incorporated by reference herein in their entirety.

Referring now to the drawings, in which like numerals represent like elements through the several figures, aspects of a method, system, apparatus, and computer-readable medium for configuring a power line networking device will be described. In the following detailed description, references are made to the accompanying drawings that form a part hereof, and which are shown by way of illustration specific embodiments or examples.

FIG. 1 shows aspects of an illustrative operative environment for the subject matter described herein. In particular, the illustrative operating environment shown in FIG. 1 includes one or more HOMEPLUG-enabled power line networking devices 104A-104B. Each of the power line networking devices 104A-104B includes power line networking hardware and may also include a wireless access point and/or a wired router or bridge. For instance, the device 104B includes the power line component 112B and a wired network component 116. The device 104A includes the power line component 112A and a wireless access point 114. It should be appreciated that although logically a HOMEPLUG gateway is a single device, such a gateway could be physically implemented as one, two, or more devices.

As shown in FIG. 1, the devices 104A-104B are operative to communicate with one another via the power lines 110A-110B. In this manner, a power line network 108 is created utilizing existing power line infrastructure. Other devices may utilize the power line network 108 by connected to one of the devices 104A-104B through either a wired connection or through a wireless network 106 created by the wireless access point 114. For instance, a wireless equipped laptop computer 102 may connect to the wireless access point 114. In one implementation, the laptop 102 is executing the WINDOWS VISTA operating system from MICROSOFT CORPORATION and can associate with the wireless access point 114 utilizing WCNv2. WCNv2 is one mechanism used by the WINDOWS VISTA operating system for the configuration of devices. This document describes how WCNv2 enabled devices that incorporate a HOMEPLUG AV transceiver, such as the power line component 112A, are configured.

As discussed briefly above, in order to secure the power line network 108, each of the devices 104A-104B must be configured with a number of security settings. As an example, consider a consumer that purchases a first pair of devices to enable power line networking. One device in the pair is attached to the laptop 102 and the other device is attached via a wired connection to an Ethernet port on a gateway or other device. The gateway may be stand-alone or a switch collapsed into a router or access point. In this scenario, nothing will occur when the first HOMEPLUG device (on the PC or router side) is connected. When the second HOMEPLUG device is plugged in, however, the new connection is automatically detected. A setup wizard, or configuration application, executing on the laptop 102 will prompt the user for the device PIN, create the WLAN settings, and configure the wireless access point 114 using the provided settings.

In order to configure the power line portion of the new device, the device (and/or the configuration application executing on the laptop 102) creates unique HOMEPLUG-compatible power line network settings based on the wireless encryption key. The created power line network settings are then utilized to configure both of the newly-added HOMEPLUG devices. If the consumer later adds a HOMEPLUG enabled device to the existing network, the device is automatically detected. The user then enters the PIN from the label on the new device and the new device is configured with the same settings as the other HOMEPLUG devices.

It should be appreciated that small businesses and other types of installations experience network setup and connectivity problems similar to those found in consumer home networks. Therefore, although home networking scenarios are described herein with reference to the illustrative operating environment, these scenarios are either identical or very similar to those for other types of networks. Accordingly, the implementations described herein may be utilized with a wide range of network installations. Additional details regarding the processes for configuring the power line devices 104A-104B utilizing network settings from the wireless network 106 will be provided below.

Figure 2:
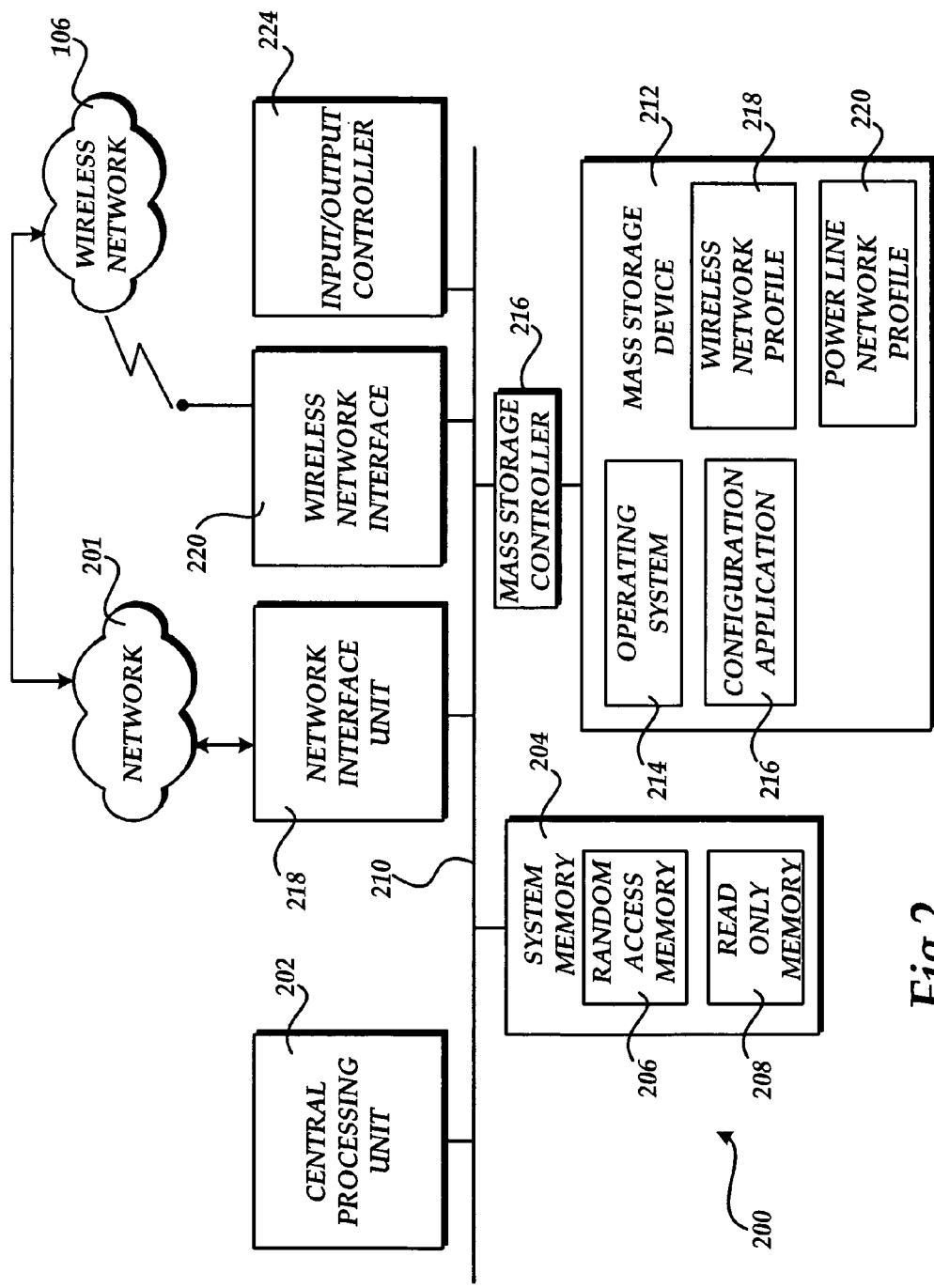
FIG. 2 is a computer architecture diagram showing a computer architecture suitable for implementing a computer system or networking device as described herein.

Referring now to FIG. 2, a brief, general description of a suitable computing environment in which the subject matter described herein may be implemented will be provided. In particular, FIG. 2 shows an illustrative computer architecture for a computing device 200. This computer architecture may be utilized to embody the computer systems illustrated in and discussed above with reference to FIG. 1. For instance, the computer architecture shown in FIG. 2 may be utilized to implement the laptop computer 102, a power line networking device 104, and any other computer systems discussed herein. It should be appreciated that although the computer architecture shown in FIG. 2 embodies a standard laptop, desktop computer, or server computer, other types of computer architectures and computing devices may be utilized. In particular, the subject matter described herein may be utilized with a conventional desktop or "personal" computer, a laptop computer, a handheld or portable computing device, a server computer, a wireless handset, such as a cellular or PCS telephone, a personal digital assistant, a custom hardware device, and virtually any other type of computing device.

The computer architecture shown in FIG. 2 includes a central processing unit 202 ("CPU"), a system memory 204, including a random access memory 206 ("RAM") and a read-only memory ("ROM") 208, and a system bus 210 that couples the memory to the CPU 202. A basic input/output system containing the basic routines that help to transfer information between elements within the computer, such as during startup, is stored in the ROM 208. The computing device 200 further includes a mass storage device 212 for storing an operating system 214, application programs, and other program modules, which will be described in greater detail below.

The mass storage device 212 is connected to the CPU 202 through a mass storage controller 216 connected to the bus 210. The mass storage device 212 and its associated computer-readable media provide non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 200.

According to various embodiments of the subject matter described herein, the computing device 200 may operate in a networked environment using logical connections to remote computers through a network 201, such as the Internet. The computing device 200 may connect to the network 201 through a network interface unit 218 connected to the bus 210. It should be appreciated that the network interface unit 218 may also be utilized to connect to other types of networks and remote computer systems. The computing device 200 may also include a wireless network interface 220 for connecting to a wireless network 106. As shown in FIG. 2, the wireless network 106 may provide a gateway for connecting to the network 201. The wireless network interface 220 may be embodied as an add-on card for the computing device 200, such as a PCMCIA adapter card, or may be physically integrated with the other components making up the computing device 200.

The wireless network interface 220 may also be compatible with various wireless networking standards. For instance, according to embodiments, the wireless network interface 220 comprises a card compatible with the IEEE 802.11b and IEEE 802.11g networking standards. The wireless network interface 220 may also be compatible with current or future long range wireless networking standards, such as WIMAX. It should be appreciated that the embodiments described herein may be utilized with virtually any wireless networking standard or protocol.

The computing device 200 may also include an input/output controller 224 for receiving and processing input from a number of other devices, including a keyboard, mouse, or electronic stylus (not shown in FIG. 2). Similarly, an input/output controller 224 may provide output to a display screen, a printer, or other type of output device (also not shown in FIG. 2).

As mentioned briefly above, a number of program modules and data files may be stored in the mass storage device 212 and RAM 206 of the computing device 200, including an operating system 214 suitable for controlling the operation of a networked personal computer, such as the WINDOWS VISTA operating system from MICROSOFT CORPORATION of Redmond, Wash. Other operating systems may also be utilized, such as the LINUX operating system, the OSX operating system from APPLE COMPUTER, INC, and others. The mass storage device 212 and RAM 206 may also store one or more program modules. In particular, the mass storage device 212 and the RAM 206 may store a configuration application 216 (also referred to herein as a "wizard").

As described in greater detail below, the operating system 214 is operative to discover unconfigured networking devices, such as unconfigured power line networking devices. In response to discovering such devices, the configuration application 216 is operative to utilize the contents of a wireless network profile 218 containing network settings for the wireless network 206 to generate a power line network profile 220. The contents of the power line network profile 220 are then utilized to configure the power line networking devices. It should be appreciated that the process of converting the wireless network settings to the power line network settings may be performed by a computer connected to the power line network or by the power line networking device itself.

In order to convert a wireless network profile to a power line network profile, the wireless network settings contained in the wireless network profile must be converted to equivalent power line network settings. In this regard, TABLE 1 illustrates the parameters used in WCNv2 and how these parameters are mapped to equivalent HOMEPLUG parameters in one implementation presented herein.

TABLE 1

| WCNv2 parameter | Equivalent HOMEPLUG 1.0 parameter | Equivalent HOMEPLUG AV parameter |
|---|---|---|
| Service Set Identifier | Network Password ("NPW") (see note 1) | STA Human Friendly ID |
| Basic Service Set | Network Password (see note 1) | HOMEPLUG AV Logical Network ("AVLN") Human Friendly ID |
| Extended Service Set ("ESS") | Network Password (see note 1) | Human Friendly ID |
| WCN PIN | Device Password | Device Password ("DPW") |
| Pre-Shared Key Passphrase | Network Password | Network Password |
| WPAv2 pre-shared Key (IEEE802.11i) | Network Encryption Key | Network Membership Key ("NMK") |
| WPA Key | Network Encryption Key | Network Membership Key |
| WEP Key (standard 64-bit WEP using a 40 bit key) | Network Encryption Key | Network Membership Key |
| WEP Key (extended 128-bit WEP protocol using a 104-bit key) | Network Encryption Key | Network Membership Key |

TABLE 1-continued

| WCNv2 parameter | Equivalent HOMEPLUG 1.0 parameter | Equivalent HOMEPLUG AV parameter |
|---|---|---|
| WEP Key (extended 256-bit WEP protocol using a 232-bit key) | Network Encryption Key | Network Membership Key |

Note 1:
The HOMEPLUG 1.0 Network Password hashes to the Network Key and is therefore equivalent to a non-announced SSID.

As shown in TABLE 1, each HOMEPLUG 1.0 power line networking device contains a Network Encryption Key ("NEK"). There is a completely defined hash function (e.g. Message-Digest Algorithm 5 ("MD5") for HOMEPLUG 1.0) to perform a one-way conversion from a user password to a key. In HOMEPLUG 1.0 the default network password "HomePlug" is hashed into the default network key of "46-D6-13-E0-F8-4A-76-4C." The default network key is eight bytes for HOMEPLUG 1.0 and HOMEPLUG TURBO and 16 bytes for HOMEPLUG AV. Almost all HOMEPLUG devices ship with the default NEK. Two devices must have the same NEK in order to communicate, including discovery of each other. HOMEPLUG TURBO and HOMEPLUG AV devices can have eight simultaneous keys, allowing them to poll the "HomePlug" default network to discover new devices while simultaneously communicating on a private network. HOMEPLUG 1.0 devices can use only one NEK. These devices must stop the private network to poll the default network for new devices.

HOMEPLUG devices trust the local (non-power line) traffic they receive and will accept a new NEK from the local network without further authentication. HOMEPLUG devices do not trust other devices on the power line to give them a new NEK without authentication. Each HOMEPLUG device also contains a second, unique, randomly generated key called a Device Encryption Key ("DEK"). The DEK is generated from a unique device password that is printed on the label of each device.

A HOMEPLUG device will accept a new NEK from the power line if it is received encrypted with the DEK from the device. Any device can accept a new NEK from its host (a processor on its non-power line interface). For power line chips embedded in WCNv2 enabled devices, there will always be a host processor performing WCNv2 that can pass the new NEK down to the power line. In some cases, devices may need to change their NEK back to the default key to discover new HOMEPLUG devices. Non-WCNv2 legacy power line devices can have their device passwords used in exactly the same manner as a PIN. Future non-WCNv2 power line devices can have their device password standard changed from 25 random alphanumeric characters to 8 or 9 numeric characters to match the WCNv2 pin format. For a complete solution, the mechanism to connect to a legacy power line device remotely using its DEK may be incorporated into WCNv2.

Figure 3:
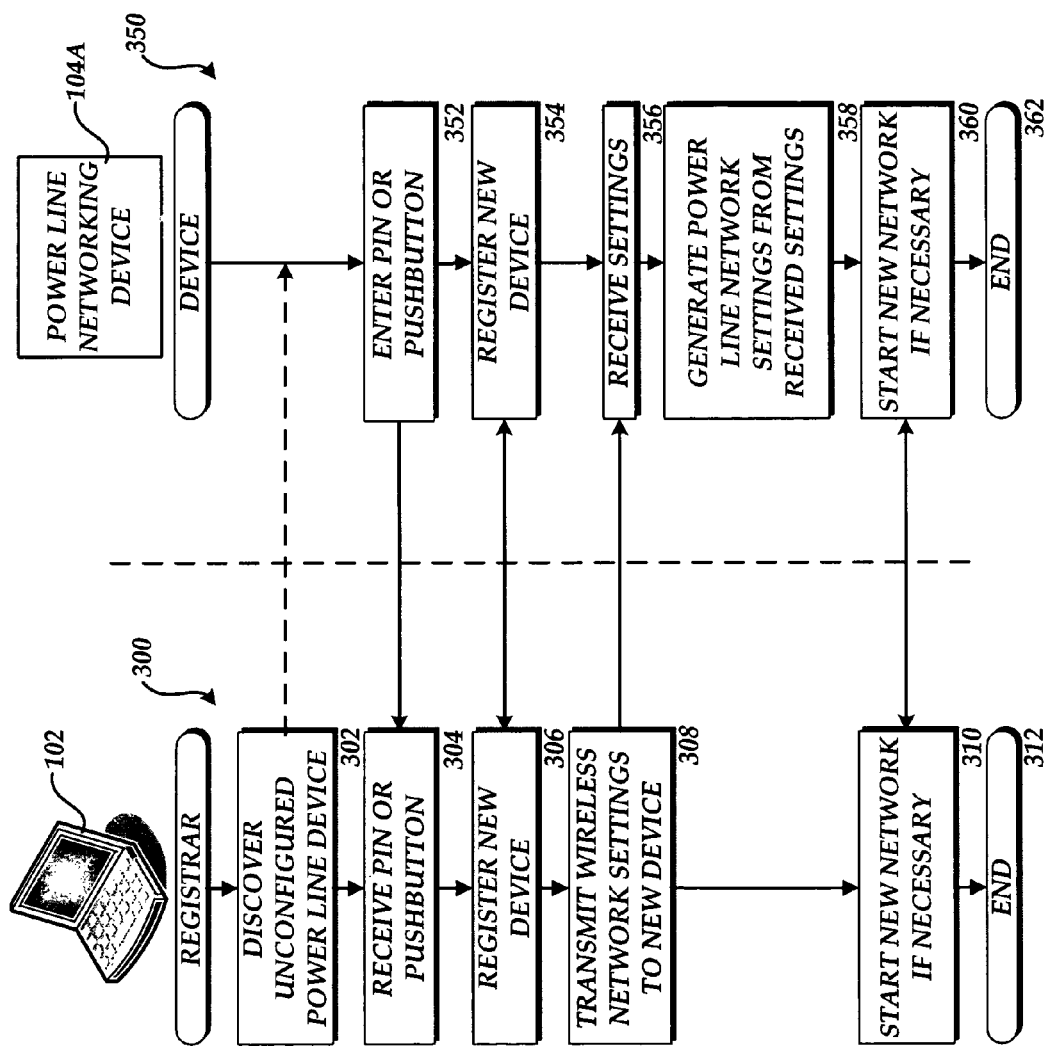
FIG. 3 is a flow diagram illustrating a process for configuring a power line networking device in one implementation described herein.

Referring now to FIG. 3, one HOMEPLUG AV WCNv2 use scenario will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein with respect to are referred to variously as operations, structural devices, acts, or modules. These operations, structural devices, acts and modules may be implemented in software, in firmware, in special purpose digital logic, and any combination.

As shown in FIG. 3, a registrar, such as the laptop 102, communicates with a wireless enabled power line networking device, such as the device 104A. The registrar may comprise a personal computer or other type of computing device capable of granting access to devices on a network. In this scenario, the device 104A comprises a HOMEPLUG AV device with a HOMEPLUG AV device password, HOMEPLUG AV WCNv2 PIN, and a HOMEPLUG AV push button. The routines 300 and 350 illustrate the processing operations performed in order to configure the device 104A for operation on the power line network.

The routine 300 begins at operation 302, where the registrar discovers that the power line networking device 104A is unconfigured. In response, the routine 300 continues to operation 304, where a user is requested to enter the PIN printed on the networking device 104A. The user enters the PIN at operation 352 of the routine 350. Once the user has done entered the PIN, the new device 104A is registered at operation 306 of the routine 300 and at operation 353 of the routine 350.

Figure 5:
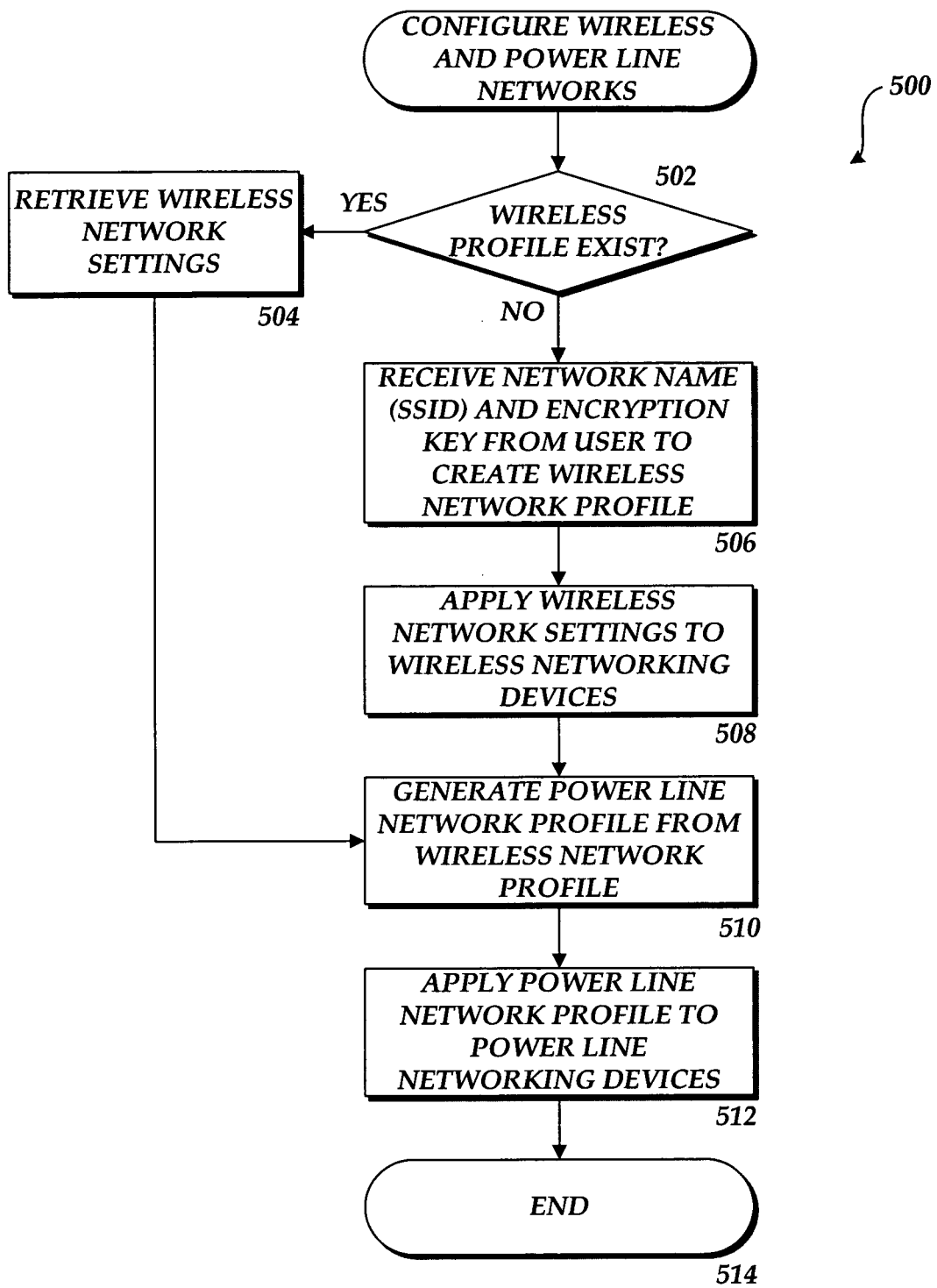
FIG. 5 is a flow diagram showing an illustrative process for configuring a power line networking device in another implementation.

Once the new device 104A has been registered, the registrar transmits the wireless network settings contained in the existing wireless profile stored at the registrar to the power line networking device 104A at operation 308. The device 104A receives the wireless network settings at operation 356. At operation 358, the device 104A generates power line network settings from the received wireless network settings. The generated power line network settings are then applied to configure the device. As discussed briefly above, in an alternate embodiment, the registrar may perform the process of converting the wireless network settings to power line network settings. In this scenario, the registrar transmits the power line network settings to the device 104A following conversion. At operations 310 and 360, a new network is started by the device 104A if it is not associated with a pre-existing network. The routines 300 and 350 end at operations 312 and 362, respectively. Additional details regarding an illustrative process for converting wireless network settings to equivalent power line network settings will be provided below with respect to FIG. 5.

It should be appreciated that, in the embodiment wherein the conversion takes place at the power line networking device 104A, a new WCNv2 message type may be created and utilized to transmit the wireless network settings to the device 104A. The new message type instructs the device 104A that wireless network settings are being transmitted. In response to receiving such a message, the device 104A understands that the settings must be converted to equivalent power line network settings. In the case where the power line device includes a wireless access point 114, the wireless network settings can be transmitted directly to the device using a standard message type and converted for use with the power line network. Similarly, in the case where the conversion takes place at the registrar, no new message type is needed to transfer the power line network settings to the device 104A.

Figure 4:
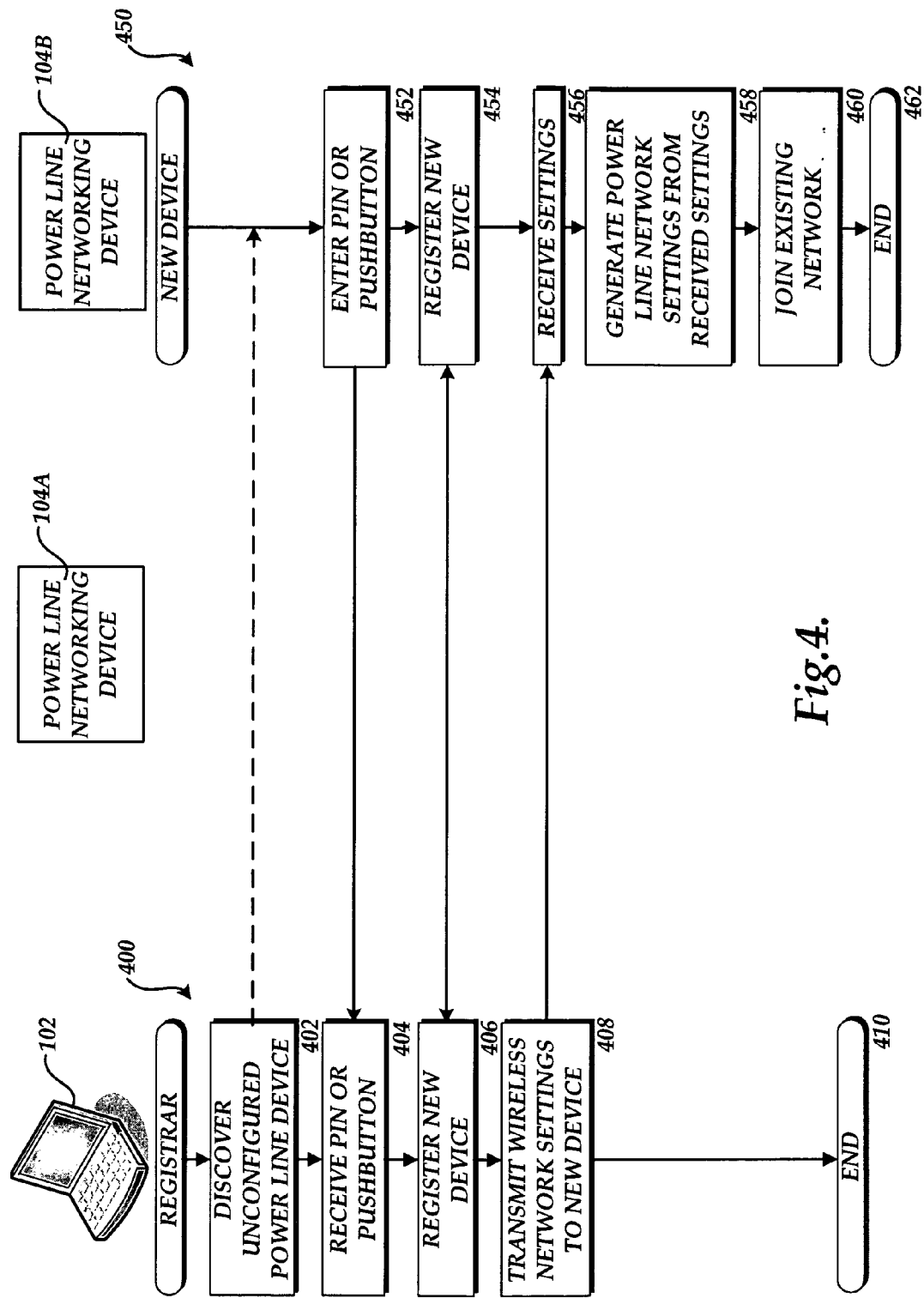
FIG. 4 is a flow diagram illustrating a process for configuring a second power line networking device in another implementation described herein.

Turning now to FIG. 4, another HOMEPLUG AV WCNv2 use scenario will be described. In this scenario, a second power line communications device 104B is being added to the network configuration shown in FIG. 3. The device 104B comprises a HOMEPLUG AV device with a HOMEPLUG AV device password, HOMEPLUG AV WCNv2 PIN, and a HOMEPLUG AV push button in this example.

As illustrated in FIG. 4, the routine 400 begins at operation 402, where the registrar discovers the new device 104B. In response to detecting the new device 104B, the user is requested to enter the PIN printed on the newly added power line device 104B. The user enters the PIN at operation 452 and the PIN is received at the registrar at operation 404. Once the PIN has been received by the registrar, the new device 104B is registered at operations 406 and 454.

Once the new device 104B has been registered, the wireless network settings are transmitted from the registrar to the new device 104B at operation 408. The wireless network settings are received at the device 104B at operation 456. The device 104B then converts the wireless network settings into power line network equivalent settings at operation 458. At operation 460, the new device 104B joins the existing network using the newly converted power line network settings. As discussed above, the conversion process may alternatively take place at the registrar. Additional details regarding an illustrative process for converting wireless network settings to equivalent power line network settings will be provided below with respect to FIG. 5.

Turning now to FIG. 500, an illustrative routine 500 will be described showing the operation of the computer system 200 for configuring a power line networking device. The routine 500 begins at decision operation 502, where a determination is made as to whether a wireless network profile 218 currently exists at the computing system 200. If a wireless profile 218 does exist, the routine 500 branches to operation 504, where the wireless network settings are retrieved from the wireless profile 218. If a wireless profile does not exist, the routine 500 continues from operation 502 to operation 506.

At operation 506, the wireless network settings are received from a user. For instance, a network name may be received and utilized as the SSID for the wireless network. An encryption key for the wireless network may also be received from the user. A new wireless profile 218 is created by the computing system 200 using these settings. The routine 500 then continues to operation 508 where the wireless settings are applied to the wireless network.

From operations 504 and 508, the routine 500 continues to operation 510, where the power line network settings are generated from the wireless network settings to create a power line network profile 220. As discussed above, this may occur at the computing system 200 or at the power line networking device itself. In order to generate the power line network settings, the configuration information from a WCN registrar is converted into HOMEPLUG AV configuration parameters. This process is described in detail below.

One portion of the process of converting wireless network settings to wire line network settings involves converting a wireless network key into a HOMEPLUG AV NMK. In order to hash a WPAv2, WPA, or WEP key into a HOMEPLUG AV NMK, the following process is performed in one implementation. In particular, the WPAv2, WPA, and WEP keys are represented as an ASCII string of hexadecimal ("HEX") characters and then treated as a HOMEPLUG AV password (the NPW). The length of the password is between 12 and 64 characters, inclusive. Wireless keys shorter than 12 characters are padded to 12 characters with the ASCII character "zero" (ASCII[48]) trailing the ASCII key. Keys longer than 64 characters are truncated to the first 64 characters. Hexadecimal values "A-F" are represented in lower case. No leading or trailing indicators of hexadecimal values (such as 0x) are used. The HOMEPLUG AV privacy function generates a HOMEPLUG AV encryption key (NMK) from the network password (NPW) using Lock-Down mode.

In one implementation, the mechanism for creating a key from a password is the Password-Based Key Derivation Function 1 ("PBKDF1") function, as shown in the PKCS #5 v2.0 standard, Password-based Cryptography Standard, using SHA-256 as the underlying hash algorithm. The iteration count used to calculate the key when associated with Lock-Down Mode or a DAK is 999, and for Unprotected or User-Confirm Mode it is 1000. The salt value is 0x0885 6DAF 7CF5 8185. After the 999th (if in Lock-Down Mode or DAK) or 1000th (if in Unprotected or User-Confirm Mode) iteration, the leftmost 16 octets of the SHA-256 output (as described in FIPS-180-2 change notice) shall be used as the AES encryption key. The first octet of the output corresponds to octet 0 of the AES encryption key. The bit ordering of the AES encryption key within an octet is dependent on where it is used. HOMEPLUG AV passwords (DPW and NPW) are limited to strings of ASCII characters chosen from the range ASCII[32] to ASCII[127]. The length of a password is between 12 and 64 characters inclusive. Passwords are not sent to the HOMEPLUG AV convergence layer ("CL") and it is recommended that they not be retained. It is also recommended that DPWs be a minimum of 15 characters long and NPWs a minimum of 24 characters long.

In order hash a WPA V2, WPA, or WEP key into a HOMEPLUG 1.0 NEK, the following process is performed in one implementation. In particular, the WPAv2, WPA, and WEP keys are represented as ASCII string of HEX characters and then treated as a HOMEPLUG 1.0 NPW. Keys shorter than four characters are padded to four characters with the ASCII character "zero" (ASCII[48]) trailing the ASCII key. Keys longer than 24 characters are truncated to the first 24 characters. Hexadecimal values "A-F" are represented in lower case and no leading or trailing indicators of hexadecimal values (such as 0x) are used. The HOMEPLUG 1.0 privacy function generates a HOMEPLUG 1.0 NEK from the NPW.

In one implementation, the mechanism for creating a key from a password is the PBKDF1 function as shown in the PKCS #5 v2.0 standard, Password-based Cryptography Standard, using MD5 as the underlying hash algorithm. The iteration count used to calculate the key is 1000. The salt value is 0x0885 6DAF 7CF5 8185. After the 1000th iteration, the first eight octets of the MD5 output are forced to odd parity to meet the odd parity requirements of FIPS PUB 46-3. The low-order bit (least significant) of each octet is modified to force odd parity. The high-order (most significant) bit of the seventh octet of the parity-corrected output corresponds to bit 1 of the DES encryption key as defined in FIPS PUB 46-3. HOMEPLUG passwords shall be limited to strings of ASCII characters chosen from the range ASCII[32] to ASCII[127]. The length of a password shall be between four and twenty four characters, inclusive.

In one implementation, the conversion logic from SSID to HFID is as follows. SSID supports up to 32 extended ASCII characters. A HOMEPLUG AV STA actually has three HFIDs. The third (user controlled) HFID is mapped to the SSID. An HFID can be up to 64 extended ASCII characters and is terminated by a null character. All 64 characters may be used and a trailing null implied. To map an SSID to an HFID, a copy is utilized. If the SSID is 32 characters, then it is null terminated when placed in the HFID. For example, a 32 character SSID should simply append a null character ASCII (0) to the end of the string and then be copied into the user controlled HFID. SSIDs are never padded during conversion to HFIDs.

Once the power line network profile 220 has been created by converting the wireless network settings in the manner described above, the routine 500 continues to operation 512, where the power line network settings are applied to the unconfigured power line network device. It should be appreciated that the process illustrated in FIG. 5 may be performed in response to the detection of an unconfigured power line network device or in response to a user request to change the security settings on the wireless or power line networks. From operation 512, the routine 500 continues to operation 514, where it ends.

Figure 6:
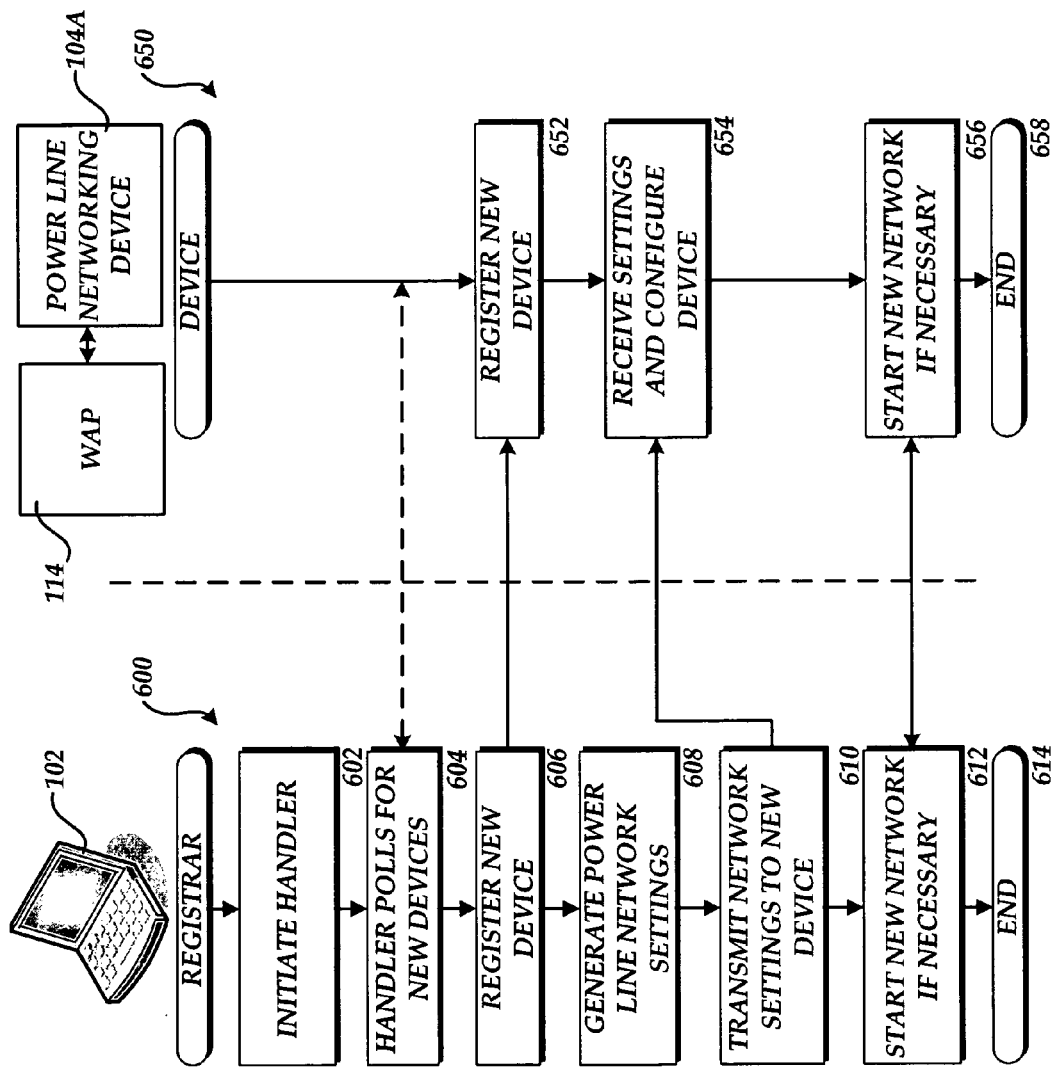
Figure 7:
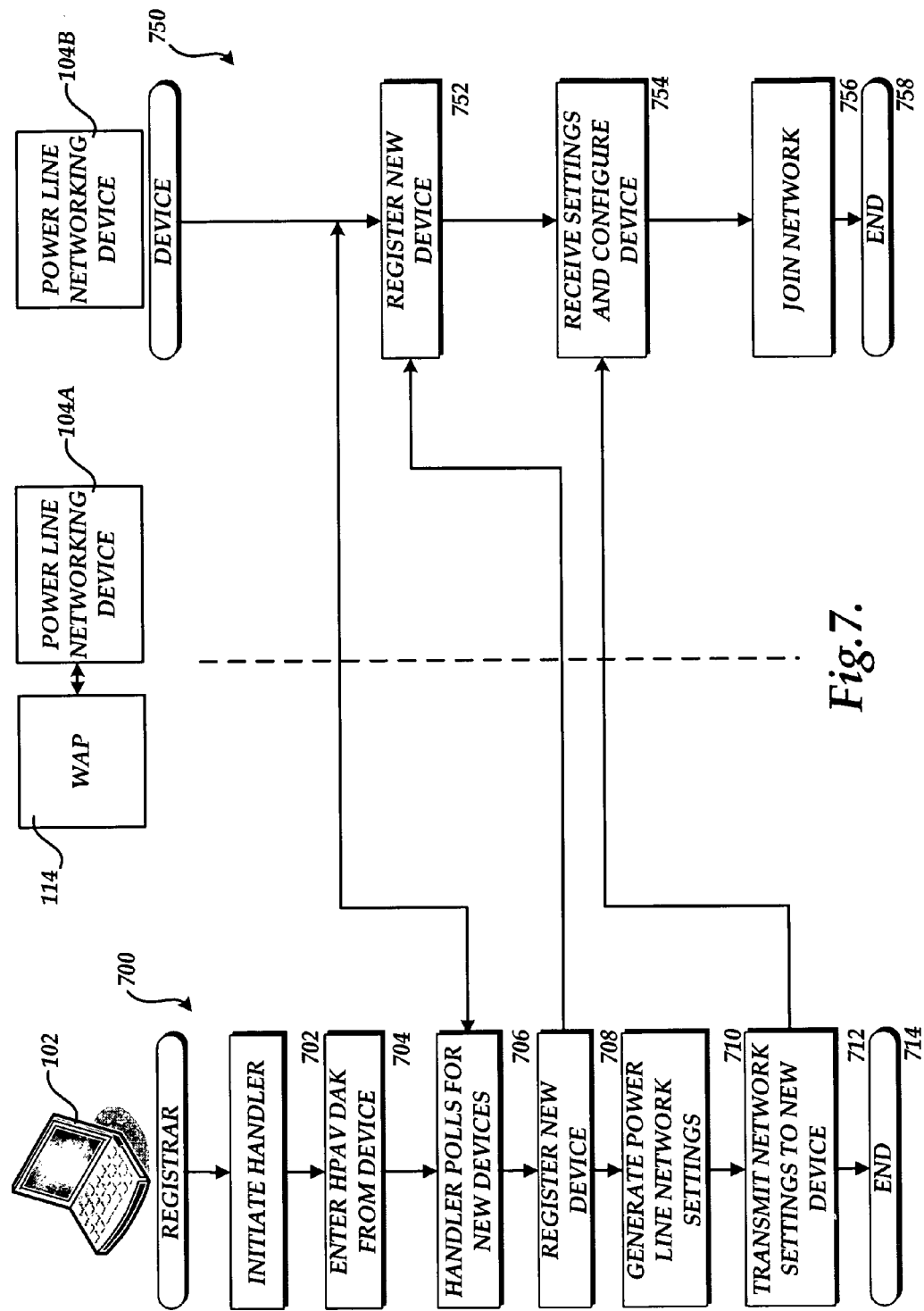

FIGS. 6 and 7 show several HOMEPLUG AV legacy use scenarios. In these scenarios, the HOMEPLUG AV devices do not incorporate the WCN protocol. In such a case, a HOMEPLUG AV application or WINDOWS VISTA operating system handler must configure the legacy devices. All HOMEPLUG devices ship with a vendor customized configuration application for down level support. The function of these applications could also be performed by a WINDOWS VISTA handler.

With reference to FIG. 6, the device 104A comprises a wireless HOMEPLUG AV device with a HOMEPLUG AV device password (DAK) for configuration. The routine 600 begins at operation 602, where the handler application is initiated on the registrar. The routine 600 then continues to operation 604, where the handler polls the network for new devices. When the handler discovers a new device, the routine 600 continues to operation 606, where the new device 104A is registered.

Once the new device 104A has been registered, the registrar generates power line network settings from the wireless network settings. This occurs at operation 608. Details regarding an illustrative process for converting wireless network settings to equivalent power line network settings were discussed above with respect to FIG. 5. The generated power line network settings are then transmitted to the new device 104A at operation 610. The new device 104A receives the settings and configures itself at operation 654. At operations 612 and 656, a new network is started if the new device 104A is not associated with a pre-existing network. The routines 600 and 650 end at operations 614 and 658, respectively.

With reference to FIG. 7, another HOMEPLUG AV use scenario will be described. In this scenario, a second power line communications device 104B is being added to the network configuration shown in FIG. 3. The device 104B comprises a HOMEPLUG AV device with a HOMEPLUG AV device password (DAK) for configuration. The device 104B is not WCN compatible.

As illustrated in FIG. 7, the routine 700 begins at operation 702, where the handler is initiated. The routine 700 then continues to operation 704, where the HOMEPLUG AV DAK from the device is entered into the handler. The routine 700 then continues to operation 704, where the handler polls for new devices. When the new device 104B is discovered, the routine 700 continues to operation 708, where the new device 104B is registered.

Once the new device 104B has been registered, the registrar generates power line network settings from the wireless network settings. This occurs at operation 710. Details regarding an illustrative process for converting wireless network settings to equivalent power line network settings were discussed above with respect to FIG. 5. The generated power line network settings are then transmitted to the new device 104B at operation 712. The new device 104B receives the settings and configures itself at operation 754. At operation 756, the new device 104B joins the existing network that includes the device 104A. The routines 700 and 750 end at operations 714 and 758, respectively.

FIGS. 8 and 9 illustrate several HOMEPLUG AV pushbutton legacy use scenarios. In these scenarios the HOMEPLUG AV pushbutton devices 104A-104B do not incorporate the WCN protocol. The pushbutton on the devices implements only the low-security HOMEPLUG AV pushbutton mechanism, not WCN. To bring the HOMEPLUG AV pushbutton devices into the WCN network, the HOMEPLUG AV pushbutton can no longer be used. The user must be prompted to enter the DAK of each HOMEPLUG AV pushbutton device. In the HOMEPLUG AV specification the placement of a DAK on each device is mandatory. This requirement is regardless of the election to add the optional pushbutton, so all HOMEPLUG AV pushbutton devices will have a DAK. The legacy setup illustrated in FIGS. 8 and 9 can occur regardless of the use of WCN in the HOMEPLUG AV network. As the HOMEPLUG AV pushbutton is optional, whenever a HOMEPLUG AV network is composed of pushbutton and non-HOMEPLUG AV pushbutton devices, all of the devices much be configured using their DAKs or with some other out-of-band mechanism.

With reference to FIG. 8, the device 104A comprises a wireless HOMEPLUG AV device with a HOMEPLUG AV device password (DAK) and a HOMEPLUG AV push button for configuration. The routine 800 begins at operation 802, where the handler application is initiated on the registrar in response to a user request or a push button event. The routine 800 then continues to operation 804, where the handler polls the network for new devices. When the handler discovers a new device, the routine 800 continues to operation 806, where the handler requires the HOMEPLUG AV DAK from the newly discovered device 104A. The new device 104A is registered at operation 808.

Once the new device 104A has been registered, the registrar generates power line network settings from the wireless network settings at operation 810. Details regarding an illustrative process for converting wireless network settings to equivalent power line network settings were discussed above with respect to FIG. 5. The generated power line network settings are then transmitted to the new device 104A at operation 812. The new device 104A receives the settings and configures itself at operation 856. At operations 814 and 858, a new network is started if the new device 104A is not associated with a pre-existing network. The routines 800 and 850 end at operations 816 and 860, respectively.

With reference to FIG. 9, another HOMEPLUG AV use scenario will be described. In this scenario, a second power line communications device 104B is being added to the network configuration shown in FIG. 3. The device 104B comprises a HOMEPLUG AV device with a HOMEPLUG AV device password (DAK) for configuration and a HOMEPLUG AV push button for configuration. The device 104B is not WCN compatible.

As illustrated in FIG. 9, the routine 900 begins at operation 902, where the handler is initiated by a user event or selection of the HOMEPLUG AV push button on the device 104B. The routine 900 then continues to operation 904, where the handler polls for new devices. At operation 906, the handler requests the HOMEPLUG AV DAK from the newly discovered device 104B. A response is provided including the HOMEPLUG AV DAK at operation 952. The routine 900 then continues to operation 908, where the new device 104B is registered.

Once the new device 104B has been registered, the registrar generates power line network settings from the wireless network settings at operation 910. Details regarding an illustrative process for converting wireless network settings to equivalent power line network settings were discussed above with respect to FIG. 5. The generated power line network settings are then transmitted to the new device 104B at operation 912. The new device 104B receives the settings and configures itself at operation 956. At operations 914 and 958, a new network is started if the newly added device 104B is not currently associated with a network. The routines 900 and 950 end at operations 916 and 960, respectively.

Based on the foregoing, it should be appreciated that systems, methods, apparatus, and computer-readable media for configuring a power line networking device are provided. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for configuring a power line networking device for operation on a power line network, the method comprising performing computer-implemented operations for:
    storing wireless network settings associated with a wireless network, the wireless network settings comprising a service set identifier (SSID) and a wireless network key;
    detecting that the power line networking device is configured for operation with the wireless network and that the power line networking device is not configured for operation with the power line network;
    in response to detecting that the power line networking device is not configured for operation with the power line network, converting the SSID and the wireless network key into equivalent power line network settings compatible with the power line network,
        wherein converting the SSID comprises appending a null character to the SSID and copying the null appended SSID as a human friendly identifier (HFID), and
        wherein converting the wireless network key comprises
            representing the wireless network key as an ASCII string of hexadecimal characters,
            padding the wireless network key with ASCII zero characters to obtain twelve-characters, in response to determining that the wireless network key has less than twelve characters, and
            truncating the wireless network key to sixty-four-characters, in response to determining that the wireless network key has greater than sixty four characters; and
    configuring the power line networking device for operation on the power line network with the converted equivalent power line network settings.

2. The method of claim 1, wherein the power line network comprises a power line network compatible with the HOMEPLUG networking standard.

3. The method of claim 1, wherein the wireless network key comprises a wired equivalent privacy (WEP) key.

4. The method of claim 1, wherein the wireless network key comprises a WI-FI protected access (WPA) key.

5. The method of claim 1, wherein the wireless network key comprises a WI-FI protected access (WPA) version two key.

6. The method of claim 1, further comprising transmitting the wireless network settings to the power line networking device prior to the converting operation, and wherein the converting operation is performed at the power line networking device.

7. The method of claim 1, wherein the converting operation is performed at a computer in communication with the power line networking device, and wherein the equivalent power line network settings are transmitted to the power line networking device from the computer.

8. A computer storage medium that is not a signal, the computer storage medium having computer-executable instructions stored thereon that, when executed by a computer, cause the computer to:
    store a wireless network profile associated with a wireless network, the wireless network settings comprising a service set identifier (SSID) and a wireless network key;
    detect that a power line networking device is not configured for operation with a power line network;
    in response to detecting that the power line networking device is not configured for operation with the power line network, convert the SSID and the wireless network key to equivalent power line network settings, wherein converting the SSID comprises appending a null character to the SSID and copying the null appended SSID as a human friendly identifier (HFID), and wherein converting the wireless network key comprises
        representing the wireless network key as an ASCII string of hexadecimal characters,
        padding the wireless network key with ASCII zero characters to obtain twelve-characters, in response to determining that the wireless network key has less than twelve characters, and
        truncating the wireless network key to sixty-four-characters, in response to determining that the wireless network key has greater than sixty four characters; and
    utilize the converted equivalent power line network settings to configure the power line networking device for operation on the power line network.

9. The computer storage medium of claim 8, wherein the power line network comprises a network compatible with the HOMEPLUG networking standard.

10. The computer storage medium of claim 8, wherein the wireless network key comprises a wired equivalent privacy (WEP) key, a WI-FI protected access (WPA) key, or a WPA version two key.

11. The computer storage medium of claim 8, further comprising computer executable instructions that, when executed by the computer, cause the computer to transmit the wireless network settings to the power line networking device prior to the converting operation, and wherein the converting operation is performed at the power line networking device.

12. A power line networking apparatus, the apparatus comprising:
   a processor;
   a memory storing a computer program and one or more wireless network settings comprising a service set identifier (SSID) and a wireless network key; and
   a power line network interface, wherein the computer program is executable by the processor and configured when executed to determine that the power line network interface is not configured for operation with a power line network compatible with the HOMEPLUG networking standard and, in response thereto, to
      convert the SSID to a human friendly identifier (HFID) by copying the SSID and appending a null character to the copied SSID,
      to convert the wireless network key to a HOMEPLUG AV password by
         representing the wireless networking key as an ASCII string of hexadecimal characters,
         padding the wireless network key with ASCII zero characters to obtain twelve-characters, in response to determining that the wireless network key has less than twelve characters, and
         truncating the wireless network key to sixty-four-characters, in response to determining that the wireless network key has greater than sixty four characters, and
         using the ASCII string of hexadecimal characters as the HOMEPLUG AV password, and
      to utilize the HFID and the HOMEPLUG AV password to configure the power line network interface for connection to the power line network.

13. The power line networking apparatus of claim 12, wherein the wireless network key comprises a wired equivalent privacy (WEP) key, a WI-FI protected access (WPA) key, or a WPA version two key.

14. The power line networking apparatus of claim 12, wherein the wireless network settings are transmitted to the power line networking interface prior to the converting operation, and wherein the converting operation is performed at the power line networking interface.

* * * * *